Dec. 5, 1933.   M. MATTSON   1,938,436
TRACTOR GUIDE
Filed May 9, 1930   2 Sheets-Sheet 1
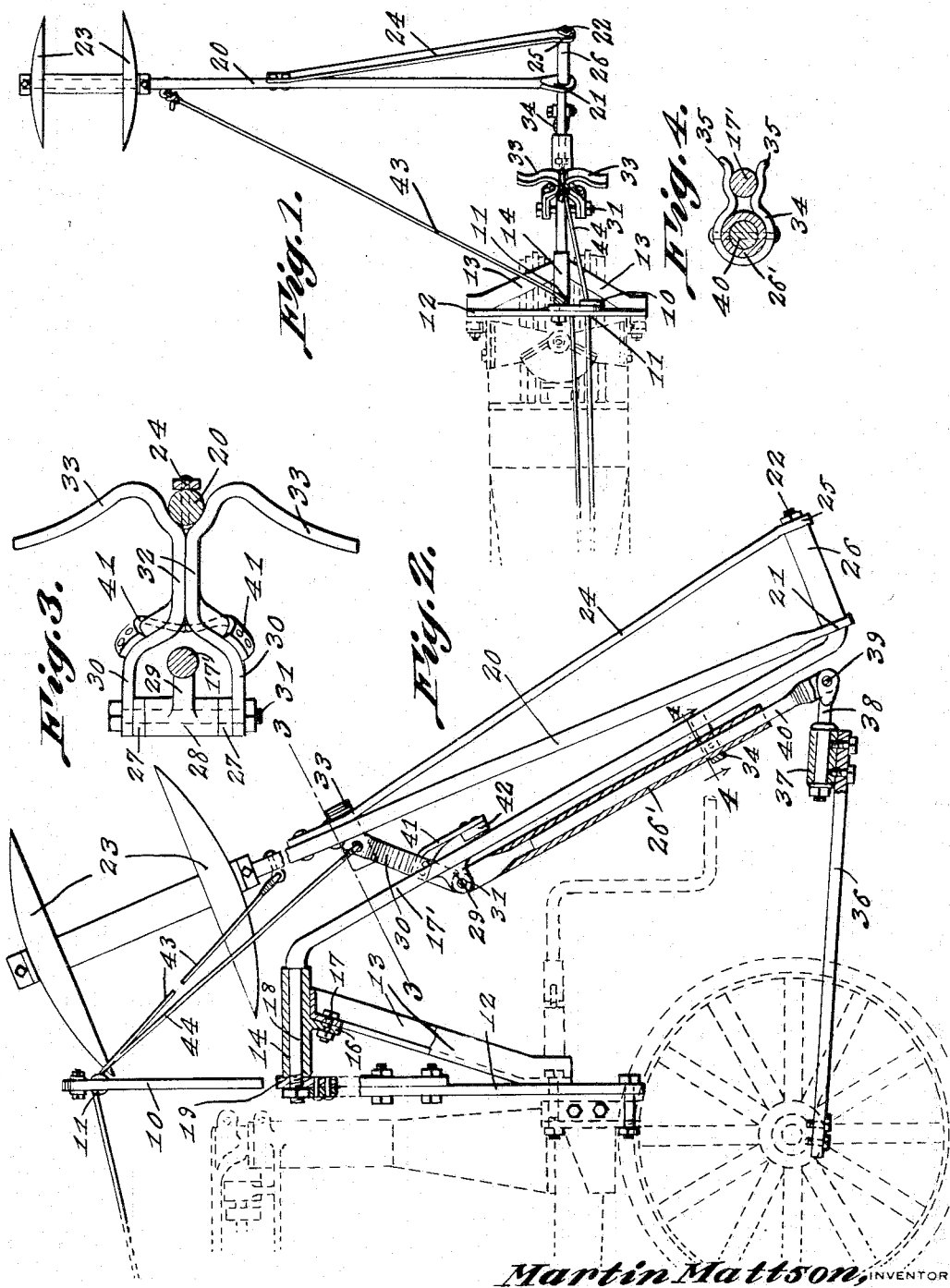

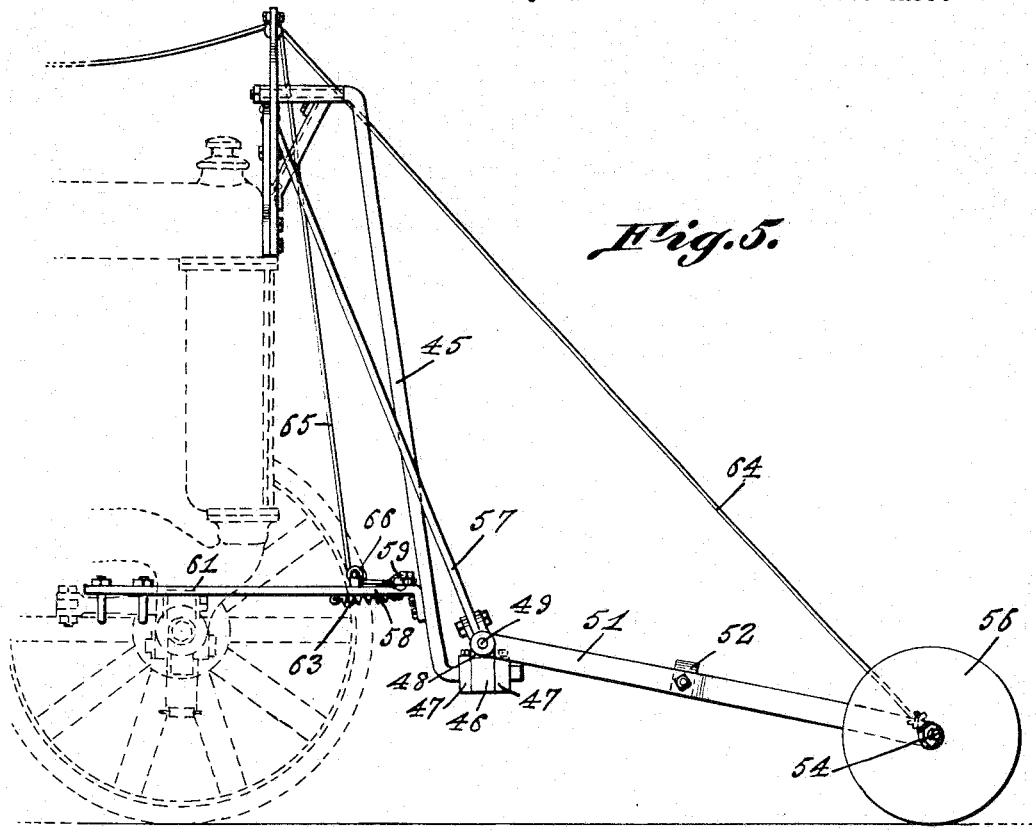
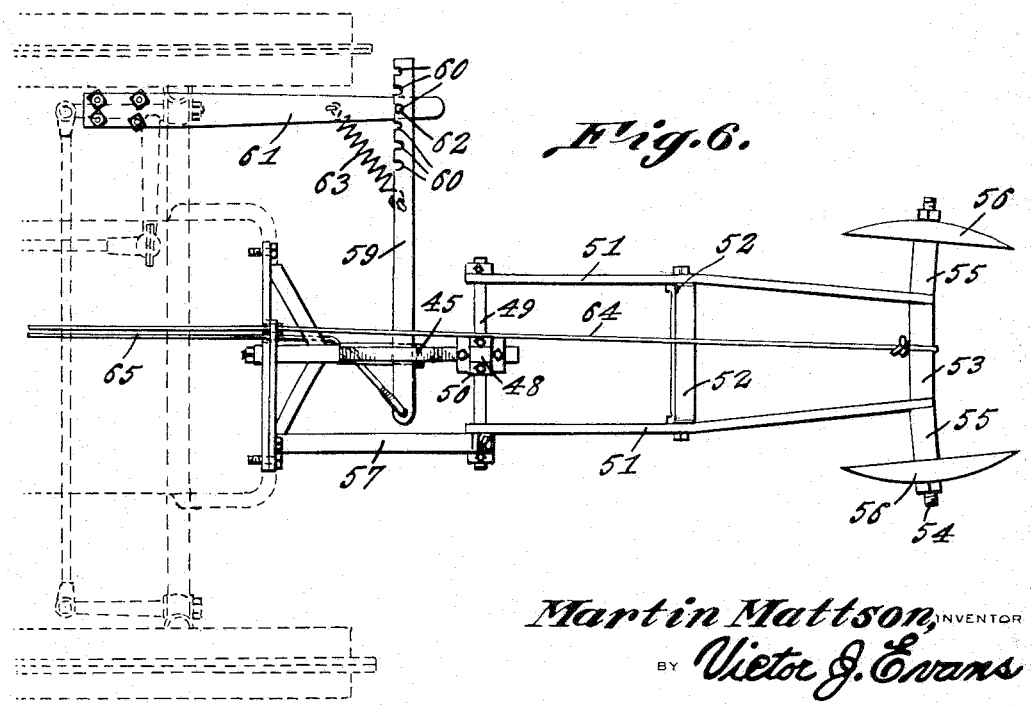

Patented Dec. 5, 1933

1,938,436

UNITED STATES PATENT OFFICE 1,938,436

TRACTOR GUIDE

Martin Mattson, Loomis, Nebr.

Application May 9, 1930. Serial No. 451,131

20 Claims. (Cl. 97—49)

This invention relates to new and useful improvements in steering guides for tractors and other implements whereby the furrows and hills in cultivated ground will be formed and maintained equal distances apart.

One of the principal objects of the invention consists of a support for the guide and from which the guide may be swung to either side of the implement.

Another object of the invention consists of means for the establishment of connection between the support and steering mechanism for the implement proper whereby corresponding motion may be transmitted to the guide to follow therewith.

Another of the major characteristics of the invention embodies the arrangement of a form of connection between the support and the steering wheels of the implement whereby binding action will be relieved at this point as the steering wheels and guides are shifted laterally of the implement proper.

With the above and other objects in view, the invention further consists of the following novel features and details of construction, to be hereinafter more fully described, illustrated in the accompanying drawings and pointed out in the appended claims.

In the drawings:

Figure 1 is a fragmentary top plan view of a form of tractor showing my improved form of guide extended laterally thereof for disposition within a furrow.

Figure 2 is a side elevation of the guide in retracted position and partly in section.

Figure 3 is a sectional view taken on line 3—3 of Figure 2.

Figure 4 is a sectional view taken on line 4—4 of Figure 2.

Figure 5 is a side elevation of a modified form of the invention as applied and extended from a different make of tractor.

Figure 6 is a top plan view of the modified form of guide when extended for use.

Referring to the drawings in detail wherein like characters of reference denote corresponding parts, the reference character 10 indicates generally a supporting arm having the uppermost end thereof inwardly and upwardly inclined to suspend therefrom a double pulley 11. A frame structure 12, carried by the tractor chassis and upon which the arm 10 is mounted, is provided with upwardly and inwardly inclined brace arms 13. A bearing sleeve 14 having a depending apertured ear 16 accommodates a form of fastening 17 which is also passed through the intermediate portions of the brace arms 13. A supporting bar 17' downwardly, forwardly and obliquely inclined in advance of the tractor is provided with a horizontally disposed offset innermost end 18 journaled within the bore of the sleeve 14. The extreme end of the horizontally disposed offset portion is tapped to accommodate a nut or other fastening located upon the opposite side of an apertured plate 19 carried upon the uppermost and intermediate portion of the frame structure 12 in the manner suggested in Figure 2 of the drawings. A guide bar 20 having an enlarged apertured portion 21 upon one end to accommodate the upwardly and obliquely inclined lowermost end 22 of the supporting bar 17' carries spaced oppositely disposed colters 23 adjacent its opposite end. These colters are designed for disposition within adjacent furrows and to span the immediate hill formed therebetween. In the appended claims the colters are designated by the word guide.

A brace bar 24 having an enlarged and apertured portion 25 upon its lowermost end to accommodate the outermost end of the upwardly and obviously disposed extremity 22 of the bar 17' is rigidly secured at its opposite end to the bar 20. A spacing sleeve 26 carried upon the upwardly and obliquely inclined end 22 of the bar 17' is interposed between the enlarged and apertured ends 21 and 25 of the bar 20 and brace bar 24 respectively.

A sleeve member 26' formed with spaced aligned apertured ears 27 upon its uppermost end to accommodate a sleeve bearing 28 therebetween is connected with the bar 17' through the employment of an extension 29 carried upon the sleeve bearing 28. Yoke arms 30 arranged in the manner suggested in Figure 3 of the drawings are aligned upon the outer sides of the ears 27 to accommodate a pivot bolt 31 passed through the entire assemblage. The yoke arms 30 are brought together forwardly and in advance of the bar 17', as at 32, and subsequently distorted to provide horn like spring like retaining arms 33. As will be noted from the Figure 3 illustration, the bar 20 is designed for accommodation between the innermost portions of the arms 33 when swung from either side of the tractor.

A clamping element 34 carried by the sleeve 26' terminates to provide spring fingers 35 to position the bar 17' therebetween.

Numeral 36 indicates a steering-arm which is rigidly mounted upon and which projects forwardly from the steering axle of the tractor, said axle and tractor being of the laterally shifting type. Said plate 36 carries a horizontally disposed bearing sleeve 37 upon its upper side adjacent the forward end thereof. A stub shaft 38 journaled within the bore of the sleeve 37 is pivoted as at 39 to the lowermost end of a shaft 40 telescopically associated with the sleeve 26'.

Brace arms 41 carried by the yoke arms 30 are downwardly and inwardly projected for rigid connection with the connecting plate 42 whereby the yoke arms 30 and retaining arms 33 will be maintained in position for use.

It will thus be seen that the steering-arm 36 which is disposed at right-angles to the axle is movably connected with the supporting-bar 17', the parts providing this connection being the tube or sleeve-member 26' (Fig. 2) which is pivotally connected at 31 with a sleeve 28, said last named sleeve having an extension 29 (Fig. 3) carried by said operating-bar 17'. Since a shaft 40 is adapted to have sliding movements in the sleeve-member 26' and is movable therein and is pivotally connected at its lower end with a stub-shaft 38 which is movably mounted in a sleeve 37 which is rigidly mounted on the front end of the steering-arm, it may be said that the steering-arm is movably connected with the operating-bar, and this last expression is recited in the appended claims. It is obvious that the movable connection of the operating-bar 17' with the steering-arm is between the ends of said bar.

Ropes or other pulleys 43 and 44 respectively, passed over the wheels of the double pulley and within convenient reach of the tractor operator, are connected at their opposite ends with the bar 20 and the yoke arms 30 whereby the latter may be released and lowered, as the case may be, when the bar 20 is to be operated from the tractor driver's seat. In case the operator was upon the ground and desired to sustain the bar 20 in the Figure 3 position, he could effect such operation merely by swinging the bar 20 hard enough against either of the spring arms 33 to deflect same out of the path of movement of said bar.

As shown in the Figure 1 illustration, the steering wheels of the form of tractor to which the invention is applied are disposed in close proximity and the plate member 36 is designed for synchronous lateral shifting and turning movement therewith.

The connections between the sleeve 26 and the bar 17' will cause the two elements to shift simultaneously to one side or the other in conjunction with the wheels of the tractor due to the fact that the offset end 18 of the bar 17' will rock within the bore of the sleeve 14. The shaft 40 telescopically associated with the sleeve 26 and pivotally connected, as at 39, with the stub shaft 38, will be laterally shifted and reciprocated within the bore of the sleeve 26 as the connection is lengthened and shortened, that is, when the wheels are shifted in one direction or the other from the normal forwardly projecting position of the bar 17'. The converse of the aforementioned action will occur when the colters 23 are in use, that is, any deviation in the direction of the furrows will transmit like movement to the steering wheels of the tractor.

It is to be noted that the improved form of guide will not only prove effective in the alleviating of constant strain on the steering wheel by the tractor operator to maintain the tractor in a true course but which will also allow the operator to release the steering wheel so that the necessary adjustments may be effected with relation to the implements being towed while the tractor is in transit.

In Figures 5 and 6 of the drawings I have illustrated a modified form of guide construction to be employed upon tractors having steering mechanisms closely resembling those employed upon the modern types of motor vehicles. The modification embodies a rod 45 corresponding in shape to and mounted after the manner of the rod 17' employed in the other form of the invention. A sleeve 46 carried upon the lowermost outwardly and forwardly projecting offset end of the bar 45 and retained against undue rectilinear motion thereon incident to the employment of stop collars 47 disposed adjacent the ends thereof, supports a bearing sleeve 48 upon the upper side thereof having the bore rightangularly disposed with relation to the bore of the sleeve 46. A cross bar 49 passed through the bore of the sleeve 48 and retained against longitudinal shifting movement therethrough by stop collars 50 has connection adjacent the extremities thereof with arms 51. The latter mentioned arms are constantly maintained in spaced relation by a spreader bar 52 located at an appropriate point in the lengths thereof and spaced from the ends whereas the outermost projecting ends are held spaced apart by a bearing sleeve 53 receiving a shaft 54 through the bore thereof. Those portions of the shaft 54 outwardly projecting from the arms 51 are slightly forwardly offset to accommodate spacing sleeves 55 and oppositely disposed colters 56 in towed-in relation whereby the colters will hug to the hill spanned by the sleeve 53 and shaft 54.

A brace member 57 establishes connection at the respective ends thereof with the supporting structure for the uppermost end of the bar 45 and the shaft 49 to constantly maintain the latter in a horizontal plane.

An attaching plate 58 carried by and horizontally projecting with relation to the bar 45 has pivotally and eccentrically associated therewith an adjusting plate 59 provided with a multiplicity of spaced cut-out portions 60. A plate member 61 carried by, rigidly secured to and forwardly projecting from one of the spindle arms of the tractor steering apparatus and projecting beneath the under side of the adjusting plate 59 to provide a support therefor, carries an upstanding projection 62 designed for selective accommodation within any one of the plurality of cut-out portions 60 in the adjusting plate 59. A retractile spring 63 having connection at its ends with the adjusting plate 59 and plate member 61 spaced from the projection and cut-out portion connection yieldingly induces the projection within the immediate cut-out portion. A pull rope 64 is provided for the purpose of elevating the guide by swinging the arms 51 therefor upon the horizontally disposed shaft 49. A pull rod 65 passed over the other wheel of the double pulley wheel and beneath a single pulley wheel 66 mounted upon the supporting plate 58 has swivel connection with the shorter end of the adjusting plate 59. As shown in Figure 6 of the drawings, the modified form of guide is extended forwardly in advance and centrally of the longitudinal center of the tractor.

In the event the tractor is to be operated upon inclines, that is, sides of hills, etc., the lateral gravity shift of the tractor necessarily qualifies the effectiveness of the steering and in such cases the pull rope 65 is operated to release the adjusting plate 59 from operative connection with the plate member 61. The steering wheels for the tractor are then turned in a direction whereby the tractor would have a tendency to gradually move down hill. The pull rope 65 is then released so that the projection 62 will be disposed in the next succeeding of the cut-out portions 60 in the adjusting plate 59. The wheels are then straightened and the colters 56 are shifted slightly up hill whereby the furrows on the hillside will be maintained and followed in parallelism. The cut-out portions 60 are arranged in such manner and in number whereby adjustments of the character described may be effected in either direction.

It is to be noted that in both forms of my invention, that is, the laterally projecting and forwardly disposed guide apparatus, the result is the same, that is, deviation of the furrows in either direction will have the corresponding motion transmitted to the steering wheels of the tractor through the colter guide apparatus whereby the hills and furrows will be maintained equal distances apart.

The invention is susceptible of various changes in its form, proportions and minor details of construction, and the right is herein reserved to make such changes as properly fall within the scope of the appended claims.

Having described the invention, what is claimed is:

1. In a tractor guide, a steering-arm rigidly mounted on the axle of the tractor, an upright supporting-bar having a horizontal upper end-portion mounted on the tractor to permit swinging movements transversely of the line of travel and having an approximately horizontal lower end-portion, said bar being normally disposed in the vertical plane of the steering-arm and movably connected with said arm, a guide-bar mounted on the supporting-bar and having a guide adapted to engage in a furrow for actuating the guide-bar, the supporting-bar and said steering-arm.

2. In a tractor-guide, a frame mounted on the front part of the tractor and provided with a horizontal sleeve, a steering-arm projecting forwardly from and rigidly mounted on the axle of the tractor, an upright supporting-bar having a horizontal upper end-portion mounted in the sleeve to permit lateral swinging movements therefrom, said bar being normally disposed in the vertical plane of and movably connected with the steering-arm, a guide-bar mounted on the lower end of the supporting-bar and having a guide adapted to travel in a furrow for moving said guide-bar, the supporting-bar and steering-arm.

3. In a tractor guide, a steering-arm extending forwardly from and rigidly mounted on the axle of the tractor, an upright supporting-bar pivotally mounted at its upper end on the tractor and connected between its ends with the steering-arm, a guide-bar mounted on the lower end of the supporting-bar, and a guide mounted on the guide-bar to travel in a furrow for moving the guide-bar, said supporting-bar, and steering-arm.

4. In a tractor guide, a frame extending above and secured to the front of the tractor, a supporting-bar inclined forwardly and downwardly at the front of the frame and having approximately horizontal end-portions, means on the frame providing a pivotal mounting for the upper approximately horizontal end-portion of the supporting-bar, a steering-arm rigidly mounted on the axle of the tractor and movably connected with the supporting-bar, and a guide-bar mounted on the lower approximately horizontal end-portion of the supporting-bar and having a guide adapted to travel in a furrow for moving the guide-bar, the supporting-bar and said steering-arm.

5. In a tractor-guide, a frame extending upwardly at the front and secured to the tractor, a bearing-sleeve mounted on said frame, a supporting-bar having a horizontal end-portion engaging in the sleeve and extending downwardly and forwardly from said frame and having an approximately horizontal lower end-portion, a steering-arm rigidly mounted on the axle of the tractor and movably connected with the supporting-bar, and a guide-bar mounted on the approximately horizontal lower end-portion of the supporting-bar and having a guide adapted to travel in a furrow for actuating the guide-bar, the supporting-bar and said steering-arm.

6. In a tractor guide, a supporting bar pivotally mounted on the tractor, a sleeve pivotally mounted on the supporting-bar, a steering-arm rigidly mounted on the axle of the tractor, a shaft carried by the steering arm and mounted to permit sliding movements in the sleeve, a guide-bar pivotally mounted on the supporting-bar and having a guide adapted to travel in a furrow for actuating the guide-bar, the supporting-bar and steering-arm.

7. In a tractor guide, a supporting-bar inclined forwardly from and pivotally mounted on the tractor, a sleeve pivotally mounted on the supporting-bar, a steering-arm rigidly mounted on the axle of the tractor and normally disposed in the vertical plane of the supporting bar, a clamping element mounted on the sleeve for removably connecting the supporting-bar with said sleeve, a shaft carried by the steering-arm and mounted to permit sliding movements in said sleeve, a guide-bar mounted pivotally on the supporting-bar and having a guide adapted to engaging in a furrow for moving the guide-bar, the supporting-bar and said steering-arm.

8. In a tractor guide, an operating-bar having end portions disposed approximately at right-angles to its body and disposed upright at the front with its upper end portion mounted upon the tractor to permit lateral swinging movements of said bar, a steering-arm mounted rigidly upon the axle of the tractor and connected with the supporting-bar, a guide-bar pivotally mounted on the lower end-portion of the operating-bar, said guide-bar having a guide adapted to travel in a furrow for moving the guide-bar, the operating-bar and said steering-arm.

9. In a tractor-guide, an upright operating-bar at the front of the tractor having an upper horizontal end-portion pivotally mounted on the tractor and provided with a lower approximately horizontal end-portion, a steering-arm mounted rigidly upon the axle of the tractor and movably connected with the operating bar, a guide-bar pivotally mounted on the lower end-portion of the operating-bar and having a guide adapted to travel in a furrow for actuating the guide-bar, said operating-bar and said steering-arm.

10. In a tractor guide, a steering-arm disposed at right-angles to the axle of the tractor and rigidly secured to said axle, and upright supporting-bar having a horizontal upper end-portion pivotally mounted on the tractor, said bar having a horizontal lower end-portion disposed in the vertical plane of the steering-arm and connected therewith, a guide-bar pivotally mounted on the supporting-bar and having a guide adapted to travel in a furrow for moving the guide-bar, said supporting-bar and said steering-arm.

11. In a tractor guide, a steering-arm disposed at right-angles to the axle of the tractor and rigidly secured to said axle, a sleeve mounted on the tractor, a supporting-bar having a horizontal end-portion mounted in said sleeve, said bar being normally disposed in the vertical plane of the steering-arm and connected therewith, and a guide-bar pivotally mounted on the supporting-bar and having a guide arranged to travel in a furrow for moving the guide-bar, said supporting-bar and said steering-arm.

12. In a tractor guide, a supporting-bar having an upper end-portion mounted on the tractor to permit rotatable movements about a horizontal axis and having an approximately horizontal lower end-portion, a steering-arm rigidly mounted at one of its ends to the axle of the tractor and disposed with its opposite end in the vertical plane of and connected with the supporting-bar, and a guide-bar pivotally mounted on the lower end-portion of the supporting bar and having a guide adapted to travel in a furrow for moving the guide-bar, said supporting-bar and said steering-arm.

13. In a guide for a tractor having an upwardly projecting frame at its front, a sleeve mounted on said frame, and an inclinedly disposed supporting-bar having its upper end mounted in said sleeve and projecting forwardly of the tractor, a steering-arm rigidly mounted at one of its ends upon the axle of the tractor and disposed with its opposite end in the vertical plane of and connected with the supporting-bar, and a guide-bar mounted on the lower end of the supporting-bar to permit swinging movements transversely of the line of travel of the tractor, said guide-bar having a guide adapted to travel in a furrow for moving the guide-bar, the supporting-bar and said steering-arm.

14. In a tractor guide, a sleeve mounted upon and disposed in a plane approximately parallel with the longitudinal axis of the tractor, an upright supporting-bar having an approximately horizontal lower terminal and having an approximately horizontal upper end-portion journalled in the sleeve, a steering-arm rigidly mounted on the axle of the tractor and connected with the supporting-bar, and a guide-bar on the lower approximately horizontal terminal of the supporting-bar and having a ground engaging member movable to cause a movement of said guide-bar, said supporting-bar and steering-arm for steering said tractor.

15. In a tractor guide, a frame rigidly mounted on the body of the tractor, a sleeve mounted on the frame and disposed in a plane approximately parallel with the longitudinal axis of said tractor, an upright supporting-bar having a lower approximately horizontal terminal part and having an upper approximately horizontal end-portion journalled in said sleeve to permit swinging movements thereof in a vertical plane, a steering-arm rigidly mounted on the axle of the tractor and movably connected with the supporting-bar, and a guide-bar mounted on the lower terminal of the supporting-bar and having a movable ground-engaging member adapted to cause movements of the guide-bar, said supporting-bar and said steering-arm.

16. In a tractor guide, a steering-arm rigidly mounted on the axle of the tractor, an upright supporting-bar connected with the steering-arm and having a horizontal end-portion mounted on the tractor to permit swinging movements in a vertical plane and to prevent swinging movements thereof in a horizontal plane, and a guide-member mounted on the lower end of the supporting-bar having a movable ground-engaging member for controlling the movements of the supporting-bar and the steering-arm.

17. In a tractor guide, a steering-arm rigidly mounted on the axle of the tractor, a supporting-frame rigidly mounted on the body of the tractor, a sleeve rigidly mounted on the frame and disposed with its longitudinal axis approximately parallel with the longitudinal axis of the tractor, an upright supporting-bar connected with the steering-arm and having an approximately horizontal upper end-portion engaging in said sleeve to permit movements of said bar in a circle's arc in a vertical plane, and a guide-bar mounted on the lower end of the supporting-bar and having a guide adapted to travel in a furrow for moving said guide-bar, said supporting-bar and said steering-arm.

18. In a tractor guide, a steering-arm rigidly mounted on the axle of the tractor, an upright supporting-bar connected with the steering-arm having a forwardly bent lower end-portion and having a rearwardly bent upper end-portion mounted on the tractor permitting swinging movements of said bar in a vertical plane at the front and transversely of the line of travel of the tractor, and a guide-bar mounted on the forwardly bent lower end-portion of the supporting-bar and having a guide adapted to move in a furrow for moving the supporting-bar and said steering-arm.

19. In a tractor guide, a steering-arm rigidly secured to the axle of the tractor, an upright supporting-bar connected with the steering-arm and having end-portions disposed in angular relation to and integral with the body of said bar, means for mounting the upper end-portion of the supporting-bar on the tractor to permit said bar to have swinging movements in a vertical plane at approximately right angles to the longitudinal axis of the tractor, and a guide-bar mounted on the lower end-portion of the supporting-bar and provided with a guide adapted to move in a furrow for moving the supporting-bar and said steering-arm.

20. In a tractor guide, an upright frame upon the front and rigidly secured to the body of the tractor, a steering-arm rigidly secured to the axle of the tractor, an upright supporting-bar connected with the steering-arm and having a rearwardly projecting part at its upper end mounted on said frame to permit swinging movements of its lower end in a vertical plane at right angles to the longitudinal axis of the tractor, and ground-engaging means on the lower end of the supporting-bar adapted to be moved for controlling the movements of the supporting-bar and steering-arm.

MARTIN MATTSON.